UNITED STATES PATENT OFFICE.

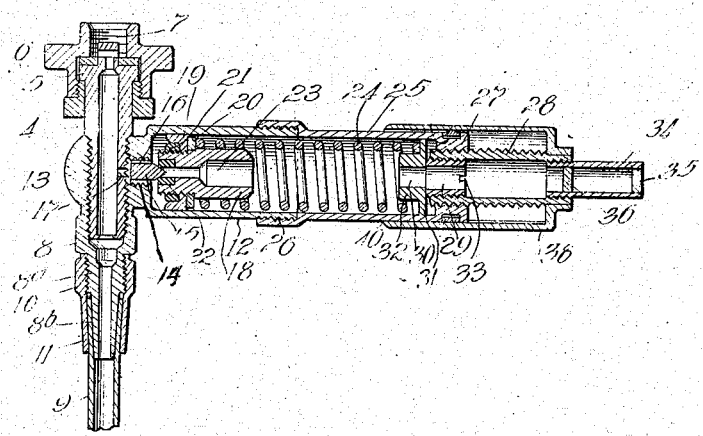

FREDERICK A. SCHROEDER, OF CHICAGO, ILLINOIS, ASSIGNOR TO THE HILL PUMP VALVE COMPANY, OF CHICAGO, ILLINOIS, A CORPORATION OF ILLINOIS.

SAFETY PRESSURE-GAGE.

1,196,142.

Specification of Letters Patent.

Patented Aug. 29, 1916.

Application filed April 23, 1915. Serial No. 23,444.

*To all whom it may concern:*

Be it known that I, FREDERICK A. SCHROEDER, a citizen of the United States, residing at Chicago, in the county of Cook and State of Illinois, have invented new and useful Improvements in Safety Pressure-Gages, of which the following is a full, clear, concise, and exact description, reference being had to the accompanying drawing, forming a part of this specification.

My invention relates to safety pressure gages, and in its more specific aspect to gages of the type having means for attachment to the valve stem of a pneumatic tire and to a source of compressed air, and in which the gage is so set that when the pressure therein reaches a predetermined point air will be permitted to escape to prevent further rise in pressure.

My invention has for its object to provide an improved device of the character indicated above, in which, when the pressure reaches a predetermined point, the air will be permitted to escape and an audible signal will be made, and which is simple and reliable in its construction and operation.

Further objects will appear from the detailed description to follow.

In the drawings, in which I illustrate one embodiment of my invention—Figure 1 is a central section of my improved device; Fig. 2 is a side elevation of the pressure gage; and Fig. 3 is a section on the line 3—3 of Fig. 2.

Referring now to the drawings a tubular member 4 is provided with an enlarged portion 5 upon which is swiveled a connecting member 6 having a threaded portion 7 for engagement with the threaded portion of the valve stem of a pneumatic tire. The other end of the member 4 has a screw threaded connection with a tubular member 8 having a threaded portion 8ª and a tapering nipple portion 8ᵇ over which is slipped the end of a tube 9. The tube 9 is held in place on the nipple by means of a sleeve 10 having a screw threaded connection with the part 8ª and a tapering sleeve portion 11 which clamps the end of the tube 9 against the nipple 8ᵇ. A hollow cylinder 12 has an extension 13 at one end thereof through which the tubular member 4 is threaded. The extension 13 has an opening 14 therein in which is threaded a conical valve member 15. The interior of the cylinder 12 is in communication with the interior of the tubular member 4 through passages between the sides of the opening 14 and the sides of the valve member 15 (which are cut away as indicated at 16), and through the opening 17 in the side of the member 4. A tubular member 18 is slidably mounted in the cylinder 12 and has an annular member 19 of leather or other suitable material secured between the nuts 20 21 and threaded on the tubular member 18, the member 19 forming an air tight packing between the tubular member 18 and the cylinder 12. At one end of the tubular member 18 is an annular valve member 22 with which the valve member 15 coöperates to close the opening through the member 22. The tubular member 18 has a center opening 23 to permit the escape of air therethrough.

A coiled spring 24 bears against the washer 20. A cylindrical shell 25 has a screw threaded connection 26 with the cylinder 12 and has a contracted portion 27 in which is threaded a sleeve 28 having a tubular bearing member 29 threaded therein. The bearing member 29 engages a washer 30 having a shoulder portion 31 engaging the spring 24 and has a reduced portion 32 surrounded by said spring. The bearing member 29 has notches 33 for engagement with a suitable tool whereby it may be adjusted in the sleeve 28. A signal device 34 is secured to the end of the sleeve 28 in any suitable manner, as by threading it therein, and is cut away as shown at 34ª to provide a lip 34ᵇ to form a whistle. The end of the signal device is closed by means of a plug 35 and a partition 36 is provided within the sounding device having an opening 37 therein through which the air escaping past the valve member 15 and through the opening 23 and sleeve 28 is directed against the lip 34ᵇ to cause a whistling sound. The sleeve 28 has fixedly secured thereto in a suitable manner a tubular operating member 38 whereby the sleeve may be screwed in and out with respect to the shell 25 to vary the tension of the spring 28. The shell 25 is provided with a scale, as indicated at 39, Fig. 2, the edge 40 of the operating member 38 acting as an indicator for said scale. The purpose of the adjustable member 33 is to enable the tension of the spring 28 to be adjusted so that the pressure at which the passage between the valve members 15 and 22 is opened will correspond to the pressure indicated on the scale.

The use and operation of my device is as follows: The gage is connected to the valve stem of a pneumatic tire by means of the threaded connection 7, the tube 9 is connected to a source of compressed air and the member 38 is adjusted until the edge 40 indicates the desired pressure on the scale 39. When this pressure is reached, the air acting on the tubular member 18 and annular member 19 will cause them to move against the pressure of the spring 24 causing the valve member 22 to move away from the valve member 15, allowing the air to escape therebetween and to flow through the opening 23 against the lip 34ᵇ, through shell 25, tubular member 29, sleeve 28 and opening 27, causing the whistle to sound, indicating that the desired pressure has been reached.

It is to be noted that in my improved device one of the valve members is fixed with respect to the cylinder, so that the piston has but a short distance to move to cause the escape valve to open.

Having thus described my invention what I claim as new and desire to secure by Letters Patent is:

1. A tire gage device comprising means for attaching said device to a valve stem, means for connecting it to a source of compressed air, and a passage between said connecting and attaching means, a cylinder, a plunger reciprocating therein having a passage therethrough, a conical valve member located in position to enter and close said passage as the plunger is moved toward it, and a passage connecting said first passage and the cylinder, said conical valve member having a portion threaded into said last passage, said threads being mutilated to provide a passage for the compressed air to the cylinder.

2. A tire gage device comprising means for attaching said device to a valve stem, means for connecting it to a source of compressed air, and a passage between said connecting and attaching means, a passage leading from said first passage, and means for controlling the escape of air through said last passage comprising a spring, adjustable means acting upon said spring for setting it for various pressures, a scale coöperating with said adjustable means for indicating the various pressures and adjustable means carried by said first adjustable means acting on said spring for securing the proper adjustment of said spring with respect to said first adjusting means so that the air will escape at the pressure indicated on said scale.

3. A tire gage device comprising means for attaching said device to a valve stem, means for connecting it to a source of compressed air, and a passage between said connecting and attaching means, a passage leading from said first passage, and means for controlling the escape of air through said last passage comprising a spring, adjustable means acting upon said spring for setting it for various pressures, a scale coöperating with said adjustable means for indicating the various pressures, and adjustable means carried by said first adjustable means acting on said spring for securing the proper adjustment of said spring with respect to said first adjusting means so that the air will escape at the pressure indicated on said scale, said first adjustable means comprising a tubular member, said other adjustable means comprising a tubular member threaded in said first tubular member, said tubular members affording a passage for the escape of the air.

4. A tire gage device comprising means for attaching said device to a valve stem, means for connecting it to a source of compressed air, and a passage between said connecting and attaching means, a passage leading from said first passage, and means for controlling the escape of air through said last passage comprising a spring, adjustable means acting upon said spring for setting it for various pressures, a scale coöperating with said adjustable means for indicating the various pressures, and adjustable means carried by said first adjustable means acting on said spring for securing the proper adjustment of said spring with respect to said first adjusting means so that the air will escape at the pressure indicated on said scale, said first adjustable means comprising a tubular member, said other adjustable means comprising a tubular member threaded in said first tubular member, said tubular members affording a passage for the escape of the air, and an air operated signal device supplied with air through said tubular members.

5. A tire gage device comprising means for attaching said device to a valve stem, means for connecting it to a source of compressed air, and a passage between said connecting and attaching means, a passage leading from said first passage, and means for controlling the escape of air through said last passage comprising a spring, adjustable means acting upon said spring for setting it for various pressures, a scale coöperating with said adjustable means for indicating the various pressures, and adjustable means carried by said first adjustable means acting on said spring for securing the proper adjustment of said spring with respect to said first adjusting means so that the air will escape at the pressure indicated on said scale, said first adjustable means comprising a tubular member, said other adjustable means comprising a tubular member threaded in said first tubular member, said tubular members affording a passage for the escape of the air, and an air operated signal device inserted into said first tubular member and secured thereto and supplied with air through said tubular members.

In witness whereof, I have hereunto subscribed my name in the presence of two witnesses.

FREDERICK A. SCHROEDER.

Witnesses:
E. H. HELLER,
N. LEVERONE.